No. 748,695. PATENTED JAN. 5, 1904.
G. R. BROWN.
VEHICLE SEAT.
APPLICATION FILED OCT. 10, 1903.
NO MODEL. 2 SHEETS—SHEET 1.

Witnesses:
H. S. Gaither
P. Schmichel

Inventor:
George R. Brown
by Wm. V. Belt
Atty.

No. 748,695. PATENTED JAN. 5, 1904.
G. R. BROWN.
VEHICLE SEAT.
APPLICATION FILED OCT. 10, 1903.
NO MODEL. 2 SHEETS—SHEET 2.
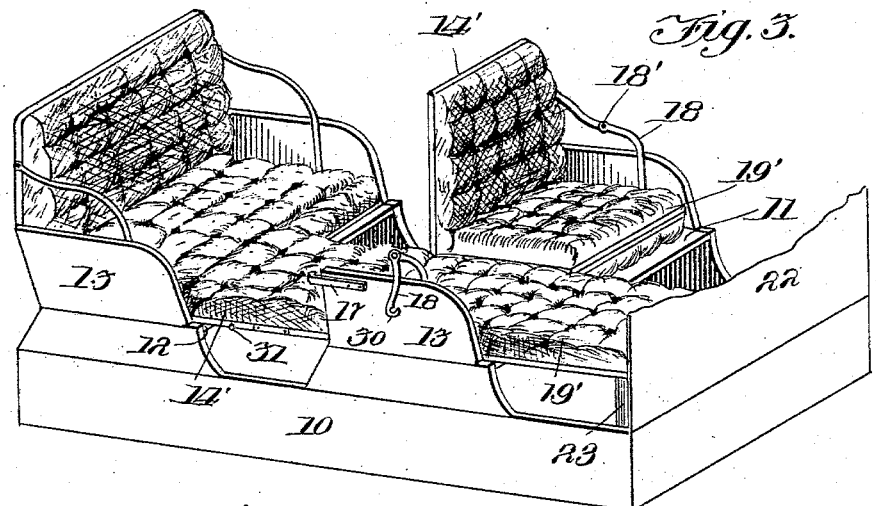
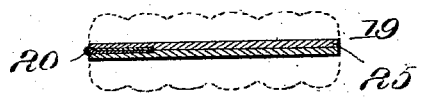
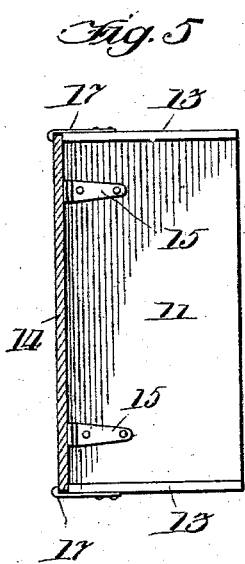
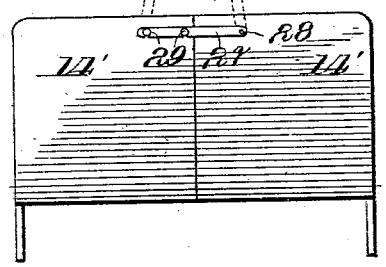
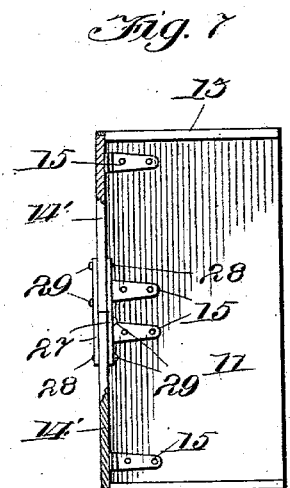
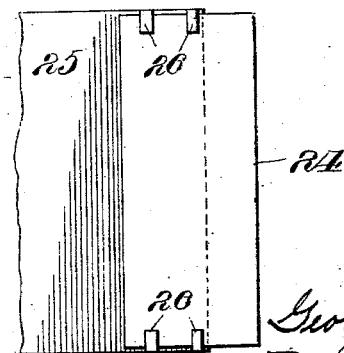
Witnesses:
H. S. Gaither
P. Schmuckel
Inventor:
George R. Brown
by Wm. C. Bell
atty.

No. 748,695. Patented January 5, 1904.

UNITED STATES PATENT OFFICE.

GEORGE R. BROWN, OF ROSEBUD AGENCY, SOUTH DAKOTA.

VEHICLE-SEAT.

SPECIFICATION forming part of Letters Patent No. 748,695, dated January 5, 1904.

Application filed October 10, 1903. Serial No. 176,523. (No model.)

*To all whom it may concern:*

Be it known that I, GEORGE R. BROWN, a citizen of the United States, residing at Rosebud Agency, in the county of Meyer and State of South Dakota, have invented certain new and useful Improvements in Vehicle-Seats, of which the following is a specification.

This invention relates to novel improvements in vehicle-seats; and its object is to provide a seat which can be readily converted into a bed.

While my invention can be embodied in vehicles of various kinds, I have chosen for illustration a light two-seated vehicle of a kind very largely used on farms and ranches and in the country generally, and it will be readily understood that the invention will be particularly useful in making long trips over extensive ranches and from one town to another.

Figure 1:
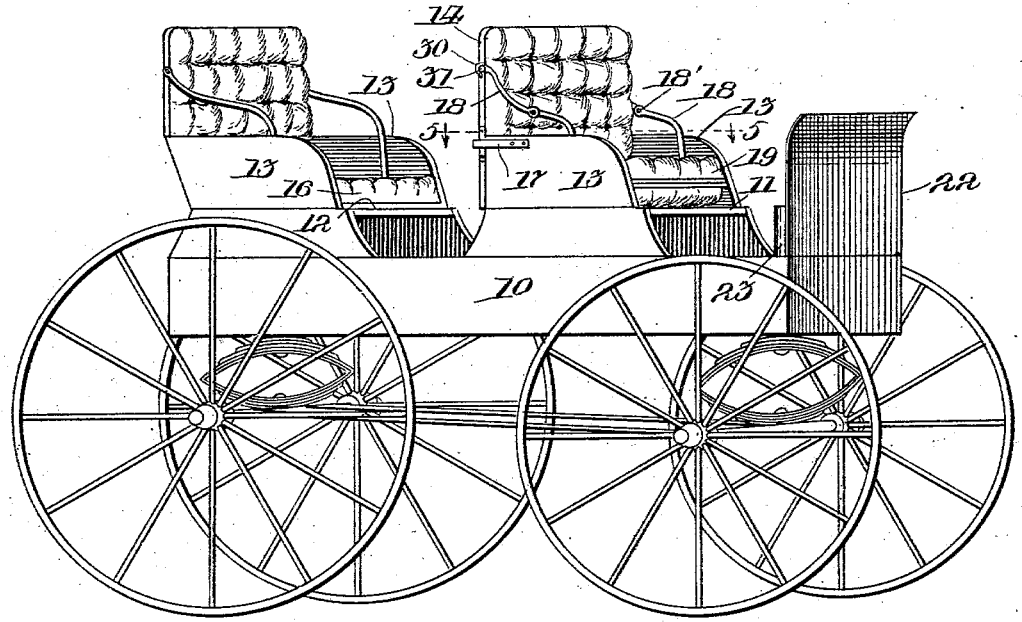
Figure 2:
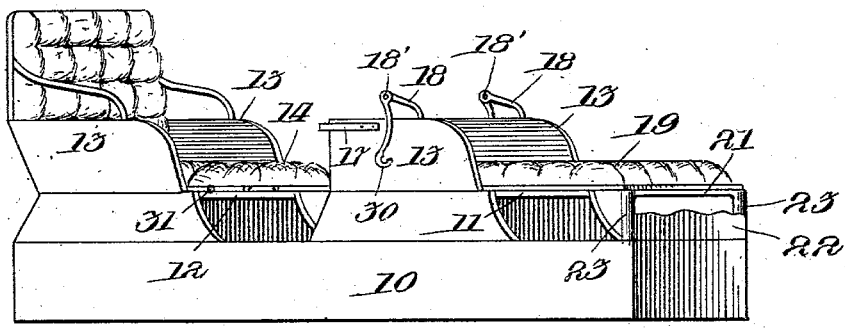

In the accompanying drawings, Figure 1 is a perspective view showing the invention embodied in a two-seated vehicle. Fig. 2 shows the vehicle-body with the seat arranged as a bed. Fig. 3 shows a divided seat, one part of which is arranged as a bed. Fig. 4 is a transverse sectional view of the double cushion. Fig. 5 is a sectional view of the seat on the line 5 5 of Fig. 1. Fig. 6 is a rear view, and Fig. 7 is a top plan view, partly in section, of the divided seat shown in Fig. 3. Fig. 8 shows an extensible section for the seat.

Like numerals of reference indicate corresponding parts in the several figures of the drawings, and referring thereto, 10 designates the body, 11 the front seat, and 12 the rear seat, of the vehicle. The seats are supported and secured to the body in any suitable manner, and may be provided with the usual sides 13. The back 14 of the front seat is secured to the seat by hinges 15, Fig. 5, which permit the back to swing down until the upper edge thereof rests upon the rear seat 12, which projects forward slightly beyond its cushion 16. The back 14 is fastened in upright position by means of spring-catches 17 and the braces 18 at each end of the seat.

I provide a double cushion 19 for the front seat, consisting of two cushions hinged together on one edge at 20, Fig. 4. When the seat is to be converted into a bed, this cushion is opened up and placed upon the seat in the manner shown in Fig. 2, with its front edge on a rod 21, supported adjacent to the dashboard 22. I may provide various means for supporting the forward edge of the front-seat cushion when extended to form a bed, and I have shown the rod 21 connected with the whip-sockets 23.

The seat-backs and the cushions are made in any suitable manner and upholstered and provided with springs or simply stuffed, as may be desired. The rear seat need extend only a very short distance beyond its cushion to support the back of the front seat. If the front cushion is not long enough when extended to reach the support on the dashboard, I may provide this cushion with a slidable section 24, which is held in place on the bottom 25 of one section of the cushion by supporting-guides 26, Fig. 8. This section can be extended when the cushion is opened to rest upon the rod 21 to support the cushion. The front seat may be extended forward beyond its cushion, like the rear seat, if desired, to better support the cushion when opened to form a bed; but this is not necessary, as the hinges can be made strong enough to support the cushion at the joint of its sections.

In Figs. 1 and 2 I have shown the entire front seat adapted to be converted into a bed; but I may divide the back and cushion of the front seat into two parts, so that the front seat may be converted partly into a bed and remain partly a seat, as shown in Fig. 3. In this construction the back of the front seat is divided vertically into two parts 14', Figs. 6, 7, which are fastened together, preferably on each side, by a catch 27, which is hinged to one section at 28 and engages one or more pins 29 on the other section of the back. The cushion will be made in two parts, as shown in Fig. 3, and the construction is such that a bed may be formed by opening the cushion and dropping the back of one portion of the front seat, while the driver may sit on the adjacent portion.

From the foregoing description and drawings it will be readily understood that the whole or only one part of the front seat may be converted into a bed, as it may be desired, to form a comparatively wide or narrow bed. The cushions and back are so made that they will lie in a level plane when formed into a bed, and they are supported in a firm and substantial manner without any breaks or open spaces between them. Various forms of spring-catches may be employed to hold the back in upright position, and the braces 18 may be entirely dispensed with if catches of sufficient strength are used. I prefer, however, to employ these braces to support the upper part of the back and hinge them at 18', at or about the middle, so that when the hooked end 30 is disengaged from the pin 31 on the back it may drop down by the side of the seat out of the way.

As before stated, the invention is capable of embodiment in vehicles of many different varieties; but I believe it will be particularly useful in connection with those vehicles which are used on farms and ranches and in making long trips, camping and touring expeditions, &c.

Without limiting myself to the specific construction and arrangement of the parts herein shown and described, what I claim, and desire to secure by Letters Patent, is—

1. In a vehicle, a seat, a back hinged to the seat, means for detachably securing the back in upright position, means for supporting the back in a horizontal position extending rearward from the seat, a folding cushion for the seat adapted to be extended to rest on the seat and project forward therefrom, and means for supporting said cushion in front of the seat.

2. In a vehicle, a front seat, a rear seat provided with a cushion and extending forwardly beyond its cushion, an upholstered back hinged to the front seat adapted to be dropped down to rest upon the projecting edge of the rear seat, means for detachably securing the back in upright position, a folding cushion for the front seat adapted to be extended to rest upon the front seat and adjacent to the upholstered back and extending forwardly of the front seat, and a support for the forward end of said extended cushion.

3. In a vehicle, a seat, a back hinged to the seat, means for securing said back in upright position, a support for the back when dropped to a horizontal position in rear of the seat, a rod supported adjacent to the dashboard of the vehicle, and a folding cushion adapted to be extended to rest upon the seat and said rod.

4. In a vehicle, a seat, a back divided vertically into two sections and both sections hinged to the seat, means for detachably securing said back in upright position, a support in rear of the seat for said back when dropped to horizontal position, a folding cushion for said seat divided into two sections corresponding to the sections of the back and adapted to be extended to rest upon said seat and project forwardly therefrom, and means for supporting the forward end of said extended cushion.

GEORGE R. BROWN.

Witnesses:
L. C. PECK,
C. C. McNEILL.